(12) United States Patent
Marovic et al.

(10) Patent No.: US 9,701,386 B2
(45) Date of Patent: Jul. 11, 2017

(54) SHAFT MADE OF FIBER COMPOSITE MATERIAL WITH FIREPROOF BULKHEAD FEEDTHROUGH

(71) Applicant: Hackforth GmbH, Herne (DE)

(72) Inventors: Radovan Marovic, Gelsenkirchen (DE); Guenther Lutz, Aldrans (AT)

(73) Assignee: Hackforth GmbH, Herne (DE)

( * ) Notice: Subject to any disclaimer, the term of this patent is extended or adjusted under 35 U.S.C. 154(b) by 48 days.

(21) Appl. No.: 14/425,382

(22) PCT Filed: Aug. 8, 2013

(86) PCT No.: PCT/EP2013/066622
§ 371 (c)(1),
(2) Date: Mar. 3, 2015

(87) PCT Pub. No.: WO2014/037185
PCT Pub. Date: Mar. 13, 2014

(65) Prior Publication Data
US 2015/0225057 A1    Aug. 13, 2015

(30) Foreign Application Priority Data
Sep. 4, 2012 (DE) .......................... 10 2012 017 434

(51) Int. Cl.
*B63H 23/36* (2006.01)
*B63H 23/34* (2006.01)
(Continued)

(52) U.S. Cl.
CPC .............. *B63H 23/34* (2013.01); *B63B 3/56* (2013.01); *F16C 3/023* (2013.01); *F16C 3/026* (2013.01);
(Continued)

(58) Field of Classification Search
CPC .............. B63H 23/34; B63H 2023/342; B63H 2023/346; B63B 3/56; F16C 3/023;
(Continued)

(56) References Cited

U.S. PATENT DOCUMENTS

| 4,530,379 A * | 7/1985 | Policelli ................... F16L 9/14 138/109 |
| 6,241,619 B1 | 6/2001 | Russell |
| 2013/0267333 A1 | 10/2013 | Lutz |

FOREIGN PATENT DOCUMENTS

| DE | 297 08 324 U1 | 7/1997 |
| DE | 196 30 835 A1 | 2/1998 |

(Continued)

OTHER PUBLICATIONS

Kirchey, Utilization of Carbon Fiber Torque Tubes in Ultralight, High Powered Propeller Shafting, SNAME, Sep. 1, 1997, vol. 1274.*
International Search Report of PCT/EP2013/066622, mailed Nov. 20, 2013.

*Primary Examiner* — Anthony Wiest
(74) *Attorney, Agent, or Firm* — Collard & Roe, P.C.

(57) ABSTRACT

An input shaft for the torque-transmitting connection of motor and propeller of a ship drive has input-side and output-side interfaces and a composite hollow shaft made of fiber composite material arranged therebetween. The input shaft has a section which is arranged between the input-side and output-side interfaces, is connected to the composite hollow shaft, and is made of non-flammable material. A ship includes a hull, a bulkhead running transversely to the longitudinal axis of the hull, a motor, a propeller and an input shaft described above. The input shaft of the ship is fed through the bulkhead and has the non-flammable section arranged in the region of the feedthrough through the bulkhead.

12 Claims, 3 Drawing Sheets

Figure 1:
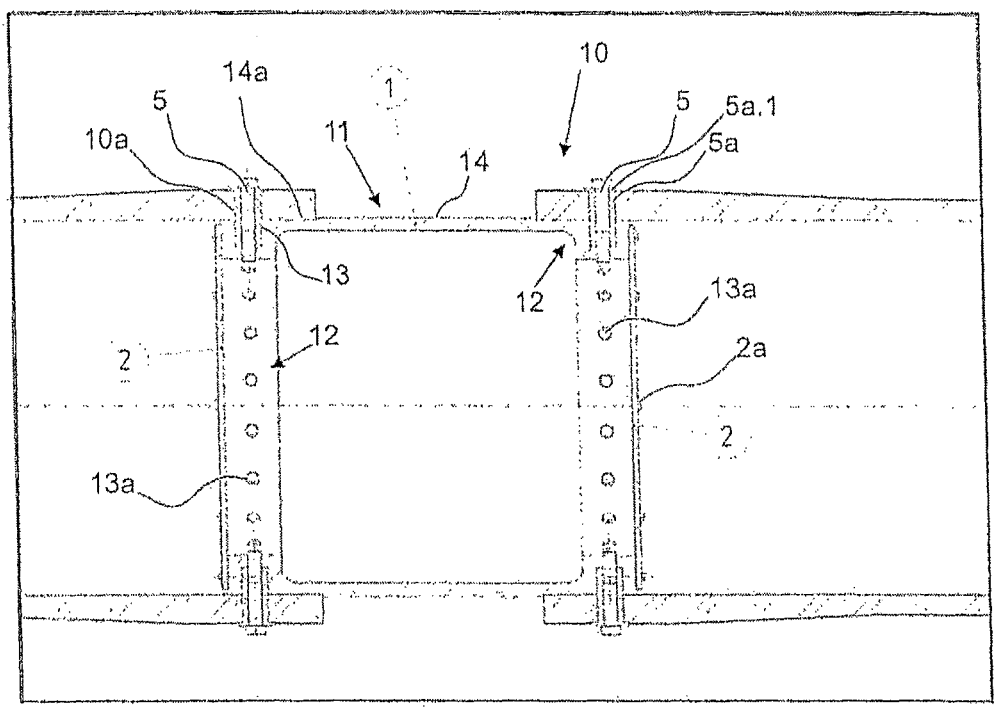

(51) Int. Cl.
  *F16C 3/02*    (2006.01)
  *B63B 3/56*    (2006.01)
  *F16D 1/02*    (2006.01)
  *F16D 1/033*   (2006.01)
  *F16D 1/04*    (2006.01)
  *F16D 1/08*    (2006.01)

(52) U.S. Cl.
  CPC ............... *F16D 1/02* (2013.01); *F16D 1/033* (2013.01); *F16D 1/04* (2013.01); *F16D 1/0847* (2013.01); *B63H 2023/342* (2013.01); *B63H 2023/346* (2013.01); *F16C 2326/30* (2013.01); *F16D 2200/006* (2013.01); *F16D 2200/0039* (2013.01)

(58) Field of Classification Search
  CPC ........ F16C 3/026; F16C 2326/30; F16D 1/02; F16D 1/033; F16D 1/04; F16D 1/0847; F16D 2200/0039; F16D 2200/006
  USPC .............................................. 440/12.57, 112
  See application file for complete search history.

(56) References Cited

FOREIGN PATENT DOCUMENTS

| | | |
|---|---|---|
| DE | 10 2010 044 464 A1 | 3/2013 |
| EP | 0 849 480 A2 | 6/1998 |
| JP | S55 36111 A | 3/1980 |

\* cited by examiner

SHAFT MADE OF FIBER COMPOSITE MATERIAL WITH FIREPROOF BULKHEAD FEEDTHROUGH

CROSS REFERENCE TO RELATED APPLICATIONS

This application is the National Stage of PCT/EP2013/066622 filed on Aug. 8, 2013, which claims priority under 35 U.S.C. §119 of German Application No. 10 2012 017 434.9 filed on Sep. 4, 2012, the disclosure of which is incorporated by reference. The international application under PCT article 21(2) was not published in English.

The invention relates to a torque-transmitting shaft made of composite fibre material (also designated as composite hollow shaft or fibre composite shaft), preferably an input shaft for a ship, which is passed through a bulkhead that separates adjacent ship compartments from each other and that is built-in transversely to the longitudinal axis of the ship hull.

Bulkheads serve for dividing a ship hull into individual waterproof compartments on the one hand and to form fire compartments on the other hand.

In particular, the present invention relates to a torque-transmitting input shaft between motor and propeller, gearbox or generator which are often designated as main drive.

In case of a fire in one compartment of a ship where the fibre composite shaft is located, there is a risk in that the fibre composite shaft starts burning. For this reason, installations and bulkhead feedthroughs with such shafts are approved by ship classifying agencies in most cases only subject to the proviso of installing a water sprinkler facility for extinction of a fire at the fibre composite shaft and at the bulkhead feedthrough.

In special cases, even the installation of a water sprinkler facility is insufficient, and the classifying agency does not approve the installation of an actually advantageously light input shaft made of fibre composite material, for example between drive motor and gearbox or generator, because a hole having the diameter of the shaft will occur in a fire-retardant bulkhead if the sprinkler facility fails and the fibre composite shaft burns completely. There is a danger in that the fire flashes from the ship compartment being on fire over into the adjacent compartment where no fire exists.

Now, therefore, it is the object of the present invention to configure an input shaft and/or an arrangement comprising an input shaft in a fireproof manner, while minimizing equipment technology expenditure or cost or built space requirements.

This object is achieved by an input shaft as described herein and/or a ship as described herein.

The present invention provides for executing the fibre composite shaft with at least one non-flammable section between input-side and output-side interfaces at the location where it penetrates through the bulkhead, equipping it more particularly with a thin-walled light-weight pipe section which is preferably made of steel, and which is provided with two closures (more particularly with covers) which preferably are also made of steel. Accordingly, the pipe section with the two closures (hereinafter also called "lock") is preferably integrated into the fibre composite shaft. In case that the part of the fibre composite shaft which is located in a compartment being on fire is burnt off, the lock made of non-flammable material and/or steel can ensure fire safety of the bulkhead, because a hole in the bulkhead cannot occur.

The section preferably has an outer diameter which is smaller than the outer diameter of the fibre composite shaft. As a result, the section can be plugged into the fibre composite shaft, and be fastened to the fibre composite shaft with radial bolts.

In accordance with an advantageous embodiment, the fibre composite material is fibre-reinforced plastic, preferably fibreglass reinforced plastic, more particularly fibreglass reinforced epoxy plastic. Thus, a low-cost material can be chosen while safety requirements can be fulfilled at the same time. In other words, thanks to this section, the choice of the fibre composite material can be taken largely independently of the flammability of a fibre composite material. High strength and long service life can be achieved with epoxy.

Preferably, the section made of non-flammable material is connected to a section of the composite hollow shaft each at its opposite ends. Accordingly, the section can be configured as an axial segment of the composite hollow shaft, and fire safety can be ensured alone by the shaft with this section.

In accordance with an advantageous embodiment, the section made of non-flammable material is formed by a metal pipe. This allows for a low-cost, rotation-symmetrical arrangement and permits a constructively simple seal versus the bulkhead. Fire safety can be increased without necessitating additional facilities or safety devices separately from the drivetrain. As compared with a conventional composite hollow shaft, built space requirements are not higher.

According to an advantageous embodiment, the metal pipe is closed on one side or on both sides by a metallic cover. Likewise, the cover can optionally be made of a non-metallic, non-flammable material. Fire safety can thus be further improved. A fire cannot flash over through this section. The (relevant) cover is preferably arranged transversely to the rotation axis of the drive shaft. Furthermore, the cover is preferably connected at its front side to a flange of the section, more particularly it is bolted to the flange in axial direction.

In accordance with an advantageous embodiment, the metal pipe is connected to the composite hollow shaft via radial bolts. A safe assembly can thus be ensured. The section can also be connected to the shaft, if the shaft has already been arranged in its final position. Owing to the radial arrangement of the bolts, assembly through the bulkhead is not complicated.

According to an advantageous embodiment, the radial bolts are plugged through radial feedthroughs of the composite hollow shaft and act on an external shell surface of the composite hollow shaft. This type of connection does not call for any further indents or targets at the hollow shaft.

According to an advantageous embodiment, one sleeve each is arranged in the radial feedthroughs which engages into the section. This allows for precise positioning in axial direction, and forces in axial direction of the shaft can be transmitted via the sleeve.

In accordance with an advantageous embodiment, the metal pipe has a flange at at least one end, with the metal pipe being connected to the composite hollow shaft via the flange by means of threaded bolts arranged axially relative to the drive shaft, wherein the threaded bolts are bolted with cross-nut bolts inserted into radial bores of the composite hollow shaft.

The bores can also be configured as feedthroughs which are not retrofitted into the composite hollow shaft, but provided already on manufacturing the composite hollow shaft, e.g. by way of appropriate spacers (placeholders) during the laminating process.

According to an advantageous embodiment, the threaded bolts are arranged at the front side at the at least one flange. A transmission of forces can be accomplished directly into the threaded bolts, more particularly a bolt head, to the section made of a metallic material, with it being possible to optionally provide a washer in order to spread the forces in a still more planar manner onto the section.

As mentioned hereinabove, the object is also achieved by a ship, the ship having a hull and at least one bulkhead running transversely to the longitudinal axis of the hull as well as a motor and a drive shaft for torque-transmitting connection of the motor with a gearbox, a generator or a propeller, with the drive shaft being fed through the bulkhead and comprised of at least one composite hollow shaft made of fibre composite material, and with the drive shaft in the region of its feedthrough through the bulkhead having at least one section made of non-flammable material and connected to the composite hollow shaft.

The ship may comprise a drive shaft having characteristic features of the embodiments described hereinabove.

According to an advantageous embodiment, the section is configured symmetrical to a plane in which the bulkhead extends.

In accordance with an advantageous embodiment, the drive shaft in the section of non-flammable material has a bulkhead seal which provides for a waterproof sealing of the drive shaft towards the bulkhead. Thus, individual compartments of a ship can be flooded in a controlled manner.

According to an advantageous embodiment, the bulkhead sealing rests at an external shell surface of the section. It extends mainly in radial direction. It is preferably of an annular configuration. Thus it is feasible to provide a low-cost robust sealing.

Figure 2:
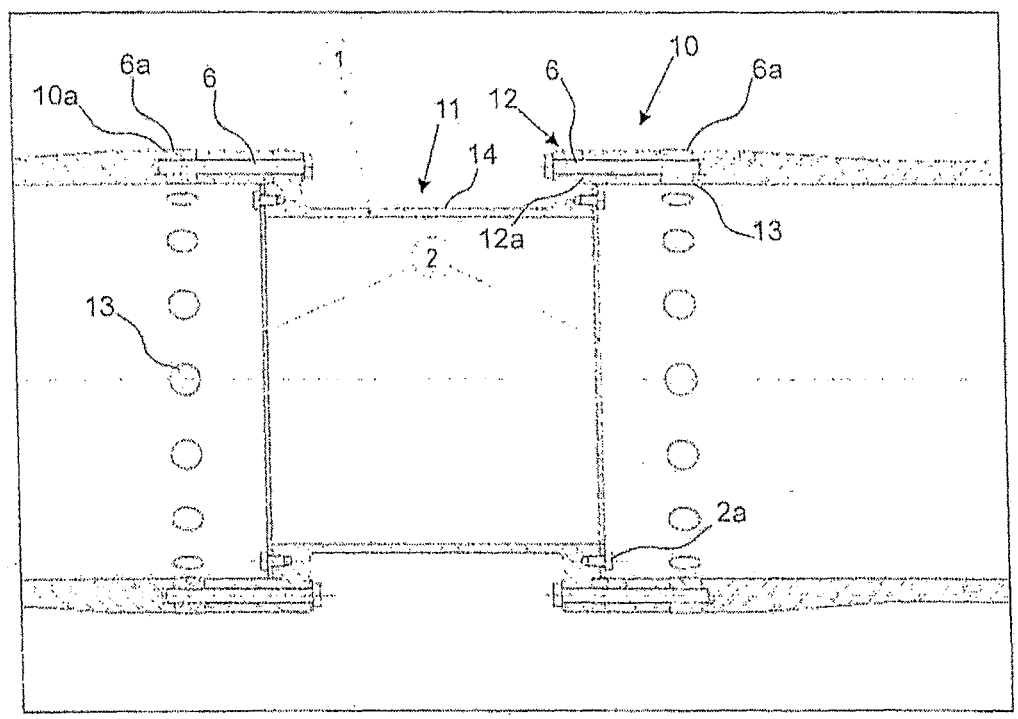
Figure 3:
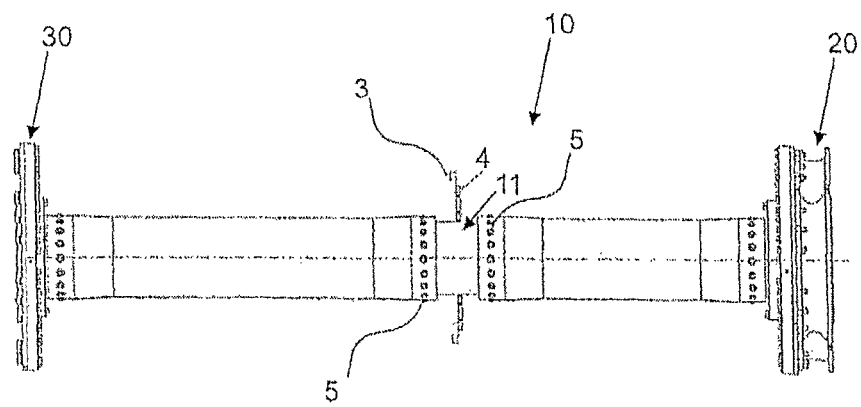

The present invention is outlined in greater detail in the following figures by way of practical examples, where:

FIG. 1 shows an arrangement in which a lock according to a practical example of the present invention is linked to both sections of the fibre composite shaft through a connection comprising radial steel bolts;

FIG. 2 shows a special connection by means of T-bolts (axial threaded bolts in combination with cross-nut bolts) as a connection between a lock according to another practical example of the present invention and the two sections of the fibre composite shaft; and FIG. 3 shows the application of a lock at a drive shaft made of fibre composite material according to a practical example of the invention which is installed between a Diesel engine (at right; not illustrated) and a generator (at left; not illustrated).

FIG. 1 shows a section and/or lock 11 and/or pipe section for a drive shaft 10 according to a practical example of the present invention, comprising a thin-walled steel pipe 1 and covers 2, with the steel pipe 1 being connected by means of radial bolts 5 to a fibre composite shaft 10 (adjacent to the left and right). The radial bolts 5 each are plugged through feedthroughs 10a provided for in the shaft 10. The covers 2 are connected each in axial direction by means of bolts 2a to the section 11. The bolts 2a engage at the front face into the flanges 12. The radial bolts 5 are anchored, more particularly bolted, in a relevant flange 12 of section 11. The relevant flange 12 is of an annular configuration, extending radially towards the inside, and for a relevant radial bolt 5 it has a pocket hole bore 13 and a female bore 13a arranged centrally therein. Arranged in the relevant pocket hole bore 13 is a sleeve 5a by means of which an exactly angular arrangement around the shaft axis and/or an axial position of section 11 in relation to shaft 10 can be ensured. Accordingly, the sleeve 5a can transfer forces between section 11 and shaft 10 without straining the bolt 5, and it can be prevented that the bolted connection becomes loose in the course of time due to vibrations or minor relative movements of section 11 versus the shaft 10. The sleeve 5a has a rim 5a.1 at which radial forces exerted from a head of bolt 5 to shaft 10 can be planarly introduced into the shaft 10. The steel pipe 1 comprises an external shell surface 14 at which two indents 14a are configured. The shaft 10 can be centred each at these indents. The indents 14a overlap the flanges 12 in axial direction. By way of this integrated arrangement plugged into each other, a high strength can be achieved.

FIG. 2 shows a lock 11 for a drive shaft and/or fibre composite shaft according to another practical example of the present invention, comprising a thin-walled steel pipe 1 and covers 2, with the steel pipe 1 being connected by means of a T-bolt connection 6, 6a to the fibre composite shaft 10. The covers 2 are connected each in axial direction by means of bolts to the section 11. The T-bolt connection 6, 6a is formed each by an axial bolt 6 and a radially arranged engagement element 6a (cross-nut bolt), with the engagement element 6a each being plugged through a feedthrough 10a provided for in the shaft 10. Configured in the relevant engagement element 6a is a female thread into which the corresponding axial bolt 6 can engage. In this manner it can be avoided that a thread must be configured in the shaft 10 which is made of fibre composite material. The engagement element 6a is merely plugged into the corresponding feedthrough 10a. In relation to the wall thickness of shaft 10, the engagement elements 6a may have a relatively large diameter so that tensile forces exerted from axial bolts 6 can be transferred to a large area and thus at relatively small compression forces between the shaft 10 and/or the corresponding shaft section and the section 11.

A relevant flange 12 of section 11 is configured in annular shape, extending radially outwardly, and it comprises an axial feedthrough bore 13 for a relevant bolt 6. Bolts 2a engage at the front face into the flanges 12. The steel pipe 1 has an external shell surface 14 which has an outer diameter that is smaller than the outer diameter of the fibre composite shaft 10. Furthermore, two indents 12a at which the shaft can be centred are configured at the flanges 12. At the indents 12a, the section 11 is plugged into the shaft 10 and/or the relevant shaft section and thereby at least partly integrated into shaft 10. The flanges 12 overlap the shaft 10 in radial direction. By way of this integrated arrangement resting against each other, high strength can be achieved, and in particular, high axial forces can be transferred without occurrence of shear forces.

FIG. 3 shows a fibre composite shaft 10 with a lock 11 according to a practical example of the present invention which is fed through a bulkhead 3, wherein a Diesel engine (not illustrated) is arranged in a compartment located to the right of bulkhead 3, and wherein the fibre composite shaft 10 is connected with a rubber coupling 20 mounted at a flywheel of the Diesel engine. At the point where the fibre composite shaft 10 is fed through the bulkhead 3, the lock 11 is integrated into shaft 10 and thus it ensures fire safety of the fibre composite shaft 10. Arranged at the left side of the fibre composite shaft 10 is a membrane coupling 30 which is connected to a generator shaft (not illustrated).

The fibre composite shaft 10 transfers the torque from the coupling (e.g. a rubber coupling with a membrane offset coupling) arranged at the Diesel engine to the coupling (e.g. membrane offset coupling) connected with the generator shaft. At the point where the fibre composite shaft 10 penetrates through the bulkhead 3, the lock 11 is integrated by means of radial bolt connections 5 into the shaft. Arranged at the outer diameter of the lock 11 is a bulkhead sealing 4 which seals the rotating shaft 10 at the lock and/or section 11 in a waterproof manner towards bulkhead 3. In case of a water ingress into either of the compartments partitioned by bulkhead 3, the bulkhead sealing 4 prevents a flowout of water from the flooded compartment into the dry compartment. Accordingly, in an advantageous manner, the bulkhead sealing 4 can run and/or rest on the correspondingly wearproof outer diameter of the lock 11.

The invention claimed is:

1. Input shaft that transmits torque from a ship drive to a ship propeller of a ship, the input shaft comprising:
   input-side and output-side interfaces, and at least one composite hollow shaft made of fiber composite material arranged therebetween,
   wherein the input shaft has at least one non-flammable section arranged between the input-side and output-side interfaces,
   wherein the at least one non-flammable section is made of non-flammable material,
   wherein the at least one non-flammable section comprises a metal pipe, and
   wherein the metal pipe is closed with a metallic cover on one side or on both sides.

2. Input shaft according to claim 1, wherein the fiber composite material is a reinforced fiber plastic.

3. Input shaft according to claim 1, wherein the metal pipe is connected to the composite hollow shaft via radial bolts.

4. Input shaft according to claim 3, wherein the radial bolts are plugged through radial feedthroughs of the composite hollow shaft and act on an external shell surface of the composite hollow shaft.

5. Input shaft according to claim 4, wherein one sleeve each is arranged in the radial feedthroughs, said sleeve engaging into the non-flammable section.

6. Input shaft according to claim 1, wherein the metal pipe has a flange at least at one end, with the metal pipe being connected to the composite hollow shaft via the flange via threaded bolts directed axially in relation to the input shaft, and
   wherein the threaded bolts are bolted with cross-nut bolts inserted into radial bores of the composite hollow shaft.

7. Input shaft according to claim 6, wherein the threaded bolts rest at the front face at the at least one flange.

8. Ship comprising:
   a hull, at least one bulkhead running transversely to the longitudinal axis of the hull, a motor, and an input shaft for the torque-transmitting connection of motor and gearbox,
   wherein the input shaft is fed through the bulkhead and has at least one composite hollow shaft made of fiber composite material,
   wherein the input shaft has at least one non-flammable section which is arranged in the region of the feedthrough through the bulkhead, is connected to the composite hollow shaft, is made of non-flammable material, and comprises a metal pipe, and
   wherein the metal pipe is closed with a metallic cover on one side or on both sides.

9. Ship according to claim 8, wherein the input shaft has input-side and output-side interfaces,
   wherein the at least one composite hollow shaft made of fiber composite material is arranged between the input-side and the output-side interfaces, and
   wherein the fiber composite material is a reinforced fiber plastic.

10. Ship according to claim 8, wherein the non-flammable section is configured symmetrical in relation to a plane in which the bulkhead extends.

11. Ship according to claim 8, wherein in the non-flammable section the input shaft has a bulkhead sealing that seals the input shaft in a waterproof manner versus the bulkhead.

12. Ship according to claim 11, wherein the bulkhead sealing rests at an external shell surface of the non-flammable section, extends mainly in radial direction, and is preferably annular.

\* \* \* \* \*